J. W. FRAZIER & F. E. HANSEN.
HOSE COUPLING.
APPLICATION FILED APR. 3, 1918.

1,274,406.

Patented Aug. 6, 1918.

Inventors,
James W. Frazier and
Fred E. Hansen
By Hull Smith Brock & West
Attys.

UNITED STATES PATENT OFFICE.

JAMES W. FRAZIER AND FRED E. HANSEN, OF CLEVELAND, OHIO.

HOSE-COUPLING.

1,274,406.  Specification of Letters Patent.  Patented Aug. 6, 1918.

Application filed April 3, 1918. Serial No. 226,373.

*To all whom it may concern:*

Be it known that we, JAMES W. FRAZIER and FRED E. HANSEN, citizens of the United States, residing at Cleveland, in the county of Cuyahoga and State of Ohio, have invented a certain new and useful Improvement in Hose-Couplings, of which the following is a full, clear, and exact description, reference being had to the accompanying drawings.

This invention relates generally to detachable couplings and more particularly to a coupling for connecting together the sections of an air supply pipe or hose.

The objects of the invention are the provision of a coupling whereby the hose sections can be quickly and easily connected and disconnected; the provision of a coupling which is safe from accidental disconnection as by twisting of the hose; the provision of a simple coupling which will provide a perfectly tight joint between the hose sections; and the provision of a coupling which can be cheaply made, is not liable to injury by freezing, obstruction by sand, or defacement by blows; while other objects will become apparent as the description proceeds.

Figure 1:
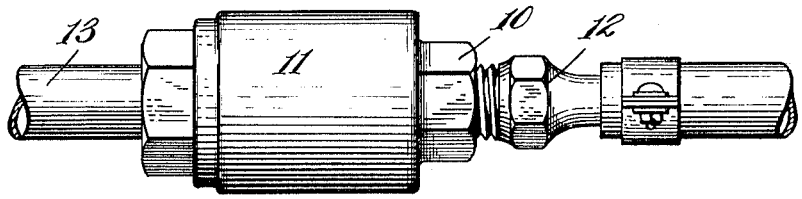
Figure 2:
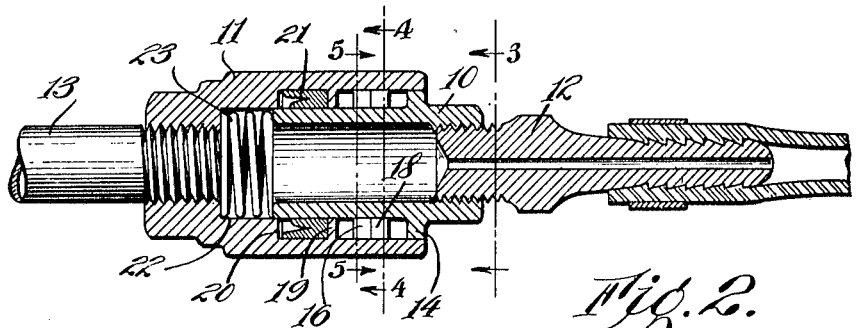
Figure 3:
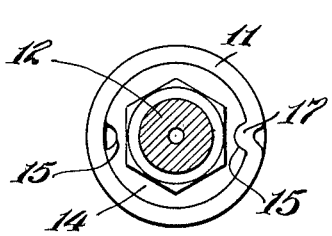
Figure 4:
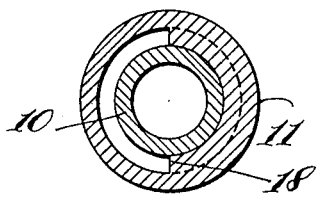
Figure 5:
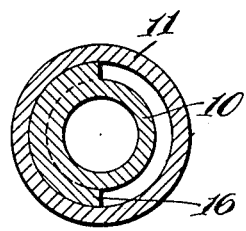
Figure 6:
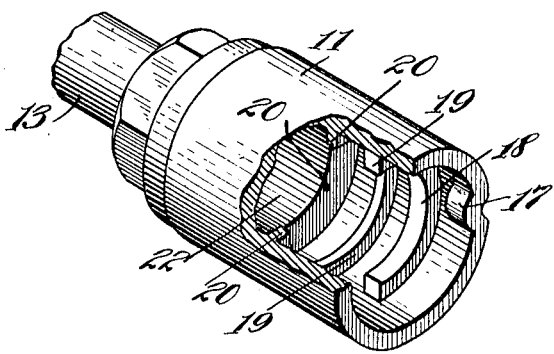
Figure 7:
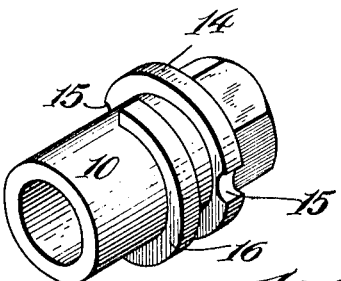

In the drawings forming a part of this specification we have shown one embodiment of our invention although without intent to limit ourselves to this construction. In these drawings Figure 1 is a side elevation of the coupling in connected condition; Fig. 2 is a vertical longitudinal sectional view of the same; Fig. 3 is a transverse vertical section on the line 3—3 of Fig. 2 looking in the direction of the arrow; Fig. 4 is a transverse vertical section taken on the line 4—4 of Fig. 2 and looking in the direction of the arrow; Fig. 5 is a transverse vertical section taken on the line 5—5 of Fig. 2 and looking in the direction of the arrows; Fig. 6 is a perspective view of the female member a part thereof being broken away; and Fig. 7 is a perspective view of the entering member of the coupling.

In the practical embodiment of our invention we employ an entering member 10 and a receiving member 11, preferably without additional movable parts. The treatment of the remote ends of these members is not important to this invention since they can be formed for the attachment of suitable flexible or rigid conduits in any convenient mode; we have shown the member 10 as threaded upon the hose nipple 12 and the member 11 as threaded upon the rigid pipe 13, but this is merely illustrative. The entering member 10 is provided with an annular exterior flange 14 spaced from its inner end and this flange 14 has notches or indentations 15 cut in the end thereof preferably at diametrically opposite points. This entering member 10 is also provided upon the exterior thereof with a transverse rib 16 spaced a short distance from the annular flange 14 and parallel therewith. In the present embodiment said rib extends slightly less than half way around the exterior of the entering member and the central portion of this rib is arranged substantially opposite one of the notches or indentations 15.

The receiving member is provided at its extreme outer end with a radial or inwardly projecting protuberance 17 of a size and shape to fit into one of the notches 15 of the annular shoulder 14, and also with an interior rib 18 complementary to the rib 16 and spaced from the protuberance 17 a distance approximately equal to the distance between the flange 14 and the rib 16. The rib 18 subtends substantially the same angle as does the rib 16, in the present embodiment just short of half way around the interior of the receiving member, and the central portion of this rib is preferably arranged substantially opposite the radial projection or protuberance 17. The interior of the receiving member is also provided with an annular flange 19, the height of said flange being substantially the same as that of the rib 18, and parallel with the annular flange 19 is an annular shoulder 20 spaced a short distance from the annular flange 19 thereby providing an interior annular groove in which is inserted a packing ring 21 of elastic material and preferably U shape in cross section, the open edge of said ring being turned away from the open end of the receiving member. Beyond the shoulder 20 the receiving member is bored out as shown at 22 to receive the extreme end of the entering member 10 and in this bore portion 22 is inserted a coil spring 23, adapted to be engaged by the end of the entering member when the coupling is effected.

In making the coupling the entering member is inserted axially into the receiving member, said members being so positioned that the ribs 16 and 18 will pass by each other, at which time the protuberance 17 will pass freely through one of the notches 15. The members are then caused to move longitudinally with reference to one another by compressing the spring until the flange 14 has been projected into the receiving member beyond the projection or protuberance 17 at which time the rib 16 will have passed beyond the rib 18, whereupon one of the members is rotated relatively to the other until the protuberance 17 comes into register with the other notch 15, in the present embodiment, one half a turn. The spring 23 will then operate to separate the members slightly and seat the protuberance in its notch, which prevents accidental rotation of the parts.

It will be obvious that the angular extent of the ribs 16 and 18 can be made smaller if desired with or without increasing their number. Thus each rib can be made less than 90° and adjacent ribs spaced equally apart so that locking and unlocking can be effected by a quarter turn. It is also clear that the protuberances and notches need not come at the middle of the ribs but may come at any point provided they be symmetrically arranged relatively to those ribs.

It is desirable, however, that the ribs be smooth, full, and complete, instead of having the locking expedients carried thereby since the manufacture of the coupling is greatly facilitated by this. It is also desirable that the locking expedients be located at the mouth of the coupling thus facilitating both their original manufacture and their subsequent use, while the interfitting lugs are best located farther inside the coupling. The protuberance 17 here shown is formed by pressing inwardly the wall of the member 11, though other means, such as a pin or rivet could equally well be used. It is merely desirable that the surface be smooth and uninterrupted during the machinery operation and this protuberance be subsequently formed.

The nature, construction, or location of the packing is not important, and in general it will be understood that numerous changes can be made within the scope of our invention.

Having thus described our invention, what we claim is:—

1. A coupling comprising an entering member having an annular exterior flange and a segmental rib spaced therefrom, and a receiving member having a socket portion adapted to receive said flange and a segmental interior rib spaced inwardly from its end and adapted to interlock with said first rib, said socket having an inward protuberance and said flange having a plurality of notches, one of said notches being so located as to register with said protuberance when said ribs are in disengaged position and another of said notches being so located as to register with said protuberance when said ribs are in engaged position.

2. A coupling comprising an entering member having a cylindrical portion formed with an annular exterior flange and a segmental exterior rib, and a receiving member having a cylindrical recess adapted to embrace said flange and also having a segmental interior rib adapted to coöperate with said first rib, the wall of said socket having an inward protuberance and said flange having a plurality of notches, one of said notches being arranged to register with said protuberance when the ribs are in disengaged position and another notch being arranged to register with said protuberance when the ribs are in engaged position.

3. A coupling comprising an entering member having an annular exterior flange and a segmental rib spaced therefrom, and a receiving member having a socket portion adapted to receive said flange and a segmental interior rib spaced inwardly from its end and adapted to interlock with said first rib, said socket having an inward protuberance and said flange having a plurality of notches, one of said notches being so located as to register with said protuberance when said ribs are in disengaged position and another of said notches being so located as to register with said protuberance when said ribs are in engaged position, and yielding means carried by one member and coöperating with the other to hold said flange in line with said protuberance when the ribs are engaged.

4. A coupling comprising a receiving member having a cylindrical bore and a socket larger than said bore, said socket being formed intermediate of its length with an internal segmental rib, an entering member having a cylindrical portion adapted to fit within said bore and a flange adapted to fit within the mouth of said socket, the exterior of said entering member being formed with a segmental rib spaced from said flange and adapted to coöperate with said first rib, yielding means located in said bore and adapted to be engaged by said entering member, and an inward protuberance carried by said socket between its mouth and rib, said flange being narrower than the space between said protuberance and rib and having notches therein for the passage of said protuberance, one notch arranged to register with said protuberance when the ribs are in engaged position and the other arranged to register with said protuberance when the ribs are in disengaged position.

5. A coupling comprising a receiving member having a socket formed internally with a protuberance and a segmental rib, and an entering member formed externally with a flange and a segmental rib adapted to coöperate with said first rib, said flange being not wider than the distance between said protuberance and first rib and having angularly spaced notches adapted to permit the passage of said protuberance, one notch registering with the protuberance when the ribs are disengaged and the other registering with said protuberance when the ribs are engaged.

6. A coupling comprising a receiving member having a socket formed internally with a protuberance and a segmental rib, and an entering member formed externally with a flange and a segmental rib adapted to coöperate with said first rib, said flange being not wider than the distance between said protuberance and first rib and having angularly spaced notches adapted to permit the passage of said protuberance, one notch registering with the protuberance when the ribs are disengaged and the other registering with said protuberance when the ribs are engaged, and a spring carried by one member and adapted to engage the other to hold the same yieldingly against inward movement.

7. A coupling comprising an entering member having an annular exterior flange and a transverse exterior rib adjacent said flange, and a receiving member having a contracted inner end, a spring located inside said receiving member and adapted to bear against the entering member, and a transverse interior rib arranged within the receiving member, the transverse ribs upon the respective members each extending substantially half way around their respective members and adapted to be brought into and held in locked relation with each other.

8. A coupling comprising an entering member having an annular exterior flange and a transverse exterior segmental rib adjacent said flange, said rib extending substantially half way around said member, a receiving member having a contracted inner end, a spring located in said end, an annular interior flange adjacent said contracted end, an interior transverse segmental rib adjacent the outer end of said receiving member, and a packing ring arranged within the receiving member upon the inner side of said annular flange.

9. A coupling comprising an entering member having an exterior annular flange formed with oppositely disposed notches or indentations and a transverse exterior segmental rib adjacent said annular flange and extending substantially half way around said member, the central portion of said rib being substantially opposite one of said indentations, a receiving member having a radial projection at its outer end, and an interior transverse segmental rib adjacent said outer end and extending half around said member, the central portion of said transverse rib being opposite said projections, an interior annular flange arranged within said entering member and spaced from the transverse rib, an annular shoulder parallel with and spaced from said annular flange providing an interior annular groove, a packing ring arranged in said groove, and a coil spring arranged at the inner end of the receiving member, the outer end of said spring being adapted to contact with the end of the entering member.

10. In a coupling a receiving member having a cylindrical socket and an entering member having a cylindrical member adapted for axial and rotary movement in said socket, interfitting bayonet-type securing devices carried by said members, other devices rigid with said members but distinct from said securing devices for locking said members against rotation while said securing devices are engaged together, and spring means for holding said locking devices in engagement.

In testimony whereof, we hereunto affix our signatures.

JAMES W. FRAZIER.
FRED E. HANSEN.